United States Patent
Douba et al.

(10) Patent No.: US 9,156,222 B2
(45) Date of Patent: Oct. 13, 2015

(54) PRESS MACHINE AND METHOD FOR DETECTING TOP DEAD CENTER THEREOF

(75) Inventors: Eiji Douba, Komatsu (JP); Hisanori Takeuchi, Nomi (JP); Hiroshi Kinoshita, Komatsu (JP); Hirohide Sato, Komatsu (JP)

(73) Assignee: KOMATSU INDUSTRIES CORP., Ishikawa (JP)

( * ) Notice: Subject to any disclaimer, the term of this patent is extended or adjusted under 35 U.S.C. 154(b) by 72 days.

(21) Appl. No.: 14/232,178

(22) PCT Filed: Jun. 26, 2012

(86) PCT No.: PCT/JP2012/066256
§ 371 (c)(1),
(2), (4) Date: Mar. 27, 2014

(87) PCT Pub. No.: WO2013/018468
PCT Pub. Date: Feb. 7, 2013

(65) Prior Publication Data
US 2014/0299008 A1    Oct. 9, 2014

(30) Foreign Application Priority Data
Jul. 29, 2011 (JP) ................. 2011-167781

(51) Int. Cl.
*B30B 15/00* (2006.01)
*B30B 15/14* (2006.01)
(Continued)

(52) U.S. Cl.
CPC . *B30B 15/00* (2013.01); *B30B 1/26* (2013.01); *B30B 15/14* (2013.01); *B30B 15/26* (2013.01); *G01B 21/16* (2013.01)

(58) Field of Classification Search
CPC .......... B30B 1/26; B30B 15/00; B30B 15/14; B30B 15/142; B30B 15/144; B30B 15/26; H02P 29/0016; G01B 21/16
USPC ............ 100/35, 43, 48, 49, 280, 282; 72/443, 72/452.5, 20.1, 21.4; 700/206, 165
See application file for complete search history.

(56) References Cited

U.S. PATENT DOCUMENTS 3,450,912 A * 6/1969 La Vallee ........................ 310/95
5,115,735 A * 5/1992 Gloe et al. ...................... 100/43
(Continued)

FOREIGN PATENT DOCUMENTS

CN     1169693 A     1/1998
CN     201151206 Y   11/2008
(Continued)

OTHER PUBLICATIONS

International Search Report (ISR) dated Oct. 2, 2012 (and English translation thereof) in International Application No. PCT/JP2012/066256.
(Continued)

*Primary Examiner* — Jimmy T Nguyen
(74) *Attorney, Agent, or Firm* — Holtz, Holtz, Goodman & Chick PC

(57) ABSTRACT

A press machine includes a controller including a top-dead-center detector adapted to: rotate a main shaft in a predetermined direction selected from a normal rotation direction and a reverse rotation direction to place a slide at a first position displaced relative to a top dead center of the slide by a predetermined height; while outputting and counting pulses from an angle detector, rotate the main shaft in a direction opposite to the predetermined direction to move the slide to a second position located at the same height as the first position beyond the top dead center; and rotate the main shaft from the second position in the predetermined direction by an amount corresponding to a half of the counted pulses to detect the top dead center.

2 Claims, 13 Drawing Sheets

(51) Int. Cl.
  *B30B 1/26* (2006.01)
  *B30B 15/26* (2006.01)
  *G01B 21/16* (2006.01)

(56) References Cited

U.S. PATENT DOCUMENTS

| | | | |
|---|---|---|---|
| 5,813,322 | A | 9/1998 | Kuroda |
| 7,069,847 | B2 * | 7/2006 | Teraoka ......................... 100/35 |
| 2010/0064907 | A1 | 3/2010 | Niizuma |
| 2011/0132209 | A1 * | 6/2011 | Senda et al. .................... 100/35 |

FOREIGN PATENT DOCUMENTS

| | | | |
|---|---|---|---|
| CN | 201580004 | U | 9/2010 |
| JP | 63-299899 | A | 12/1988 |
| JP | 02-80200 | A | 3/1990 |
| JP | 05-237698 | A | 9/1993 |
| JP | 2001-079697 | A | 3/2001 |
| JP | 2002-192399 | A | 7/2002 |
| JP | 2003-260598 | A | 9/2003 |
| JP | 2004-042099 | A | 2/2004 |
| JP | 2004-058152 | A | 2/2004 |
| JP | 2005-219089 | A | 8/2005 |
| JP | 2008-023578 | A | 2/2008 |

OTHER PUBLICATIONS

Related U.S. Appl. No. 14/232,159; Eiji Douba et al.; Press Machine and Method for Adjusting Slide Position Thereof; filed Jan. 10, 2014.
English translation of an International Preliminary Report on Patentability (IPRP) including Written Opinion dated Feb. 4, 2014 in parent International Application No. PCT/JP2012/066256.

* cited by examiner

PRESS MACHINE AND METHOD FOR DETECTING TOP DEAD CENTER THEREOF

TECHNICAL FIELD

The present invention relates to a press machine driven by, in particular, an electric servo motor, and a method of detecting a top dead center therefor.

BACKGROUND ART

There is conventionally known a press machine in which an upper end of a connecting rod is connected to an eccentric portion of a main shaft and a slide is attached to a lower end of the connecting rod without a plunger interposed therebetween (see, for instance, Patent Literature 1). Since no plunger exists between the connecting rod and the slide, a structure of the press machine can be simplified and the total height of the press machine can be lowered.

These days, an electric servo motor is frequently used as a driving source for a main shaft. When a press machine uses a servo motor, a slide motion is advantageously controllable as desired by adjusting, for instance, the drive speed and/or the driving start position of the servo motor. For instance, in a typical press machine, a waiting position of a slide usually corresponds to a top dead center. However, when a servo motor is used, the waiting position of the slide may be set at a position with the main shaft being normally rotated by a predetermined crank angle $\theta$.

In such a case, for instance, a reverse motion and a reciprocating (oscillatory) motion are possible. In the reverse motion, the slide is first moved to a bottom dead center from the waiting position by normally rotating the main shaft and then returned to the original position (i.e., the waiting position) from the bottom dead center by reversely rotating the main shaft. In the reciprocating motion, after moved to the bottom dead center, the slide is continuously moved to another waiting position that is away from the top dead center by an amount corresponding to an angle minus $\theta$ by normally rotating the main shaft so that the slide is moved back to the original waiting position corresponding to the angle $\theta$ from the waiting position corresponding to the angle minus $\theta$ via the bottom dead center to press the next workpiece.

CITATION LIST

Patent Literature(s)

Patent Literature 1: JP-A-5-237698

SUMMARY OF THE INVENTION

Problem(s) to be Solved by the Invention

In a typical press machine, a slide is generally kept waiting at the top dead center before moved during adjustment of a die height irrespective of whether or not the driving source is a servo motor. In a downsized press machine without a plunger, in order to adjust the die height, a connecting rod provided with an extendable structure is extended/contracted and a height of the slide is detected by a position detector after the extension/contraction of the connecting rod.

In contrast, in a press machine driven by a servo motor, when the waiting position of the slide is displaced from the top dead center, it is preferable that a die height be adjusted with the slide being kept at the waiting position. In this manner, an annoying operation of moving the slide to the top dead center before adjustment of the die height can be omitted.

A displacement of the slide for adjustment of the die height is determined depending on a current die height. Accordingly, since the die height has to be accurately detected before adjustment of the die height, it is required to tentatively move the slide to the exact top dead center and recalculate the current die height from the slide position corresponding to the top dead center.

However, moving the slide to the top dead center is annoying as described above and, moreover, it disadvantageously takes time to detect the exact position of the top dead center and move the slide thereto.

An object of the invention is to provide a press machine capable of easily and accurately detecting a position corresponding to a top dead center and a method of detecting the top dead center for the press machine.

Means for Solving the Problem(s)

According to a first aspect of the invention, a press machine includes: a slide; a bolster being located below the slide; an extendable connecting rod with a lower end that is directly connected to the slide or connected to the slide via a plunger; a main shaft including an eccentric portion to which an upper end of the connecting rod is connected; a pulse-outputting angle detector being adapted to detect a crank angle of the eccentric portion of the main shaft; a servo motor being adapted to drive the main shaft; and a controller being adapted to control the servo motor, in which the controller includes a top-dead-center detector that is adapted to: rotate the main shaft in a predetermined direction selected from a normal rotation direction and a reverse rotation direction to place the slide at a first position displaced relative to a top dead center of the slide by a predetermined height; while outputting and counting pulses from the angle detector, rotate the main shaft in a direction opposite to the predetermined direction to move the slide to a second position located at the same height as the first position beyond the top dead center; and rotate the main shaft from the second position in the predetermined direction by an amount corresponding to a half of the counted pulses to detect the top dead center.

According to a second aspect of the invention, a top-dead-center detecting method for a press machine that includes: a slide; a bolster located below the slide; an extendable connecting rod with a lower end that is directly connected to the slide or connected to the slide via a plunger; a main shaft including an eccentric portion to which an upper end of the connecting rod is connected; a pulse-outputting angle detector being adapted to detect a crank angle of the eccentric portion of the main shaft; a servo motor being adapted to drive the main shaft; and a controller being adapted to control the servo motor to perform the method, includes: rotating the main shaft in a predetermined direction selected from a normal rotation direction and a reverse rotation direction to place the slide at a first position displaced relative to a top dead center of the slide by a predetermined height; while outputting and counting pulses from the angle detector, rotating the main shaft in a direction opposite to the predetermined direction to move the slide to a second position located at the same height as the first position beyond the top dead center; and rotating the main shaft from the second position in the predetermined direction by an amount corresponding to a half of the counted pulses to detect the top dead center.

According to each of the first and second aspects, since the top dead center is automatically detected by the top-deadcenter detector based on the number of pulses corresponding to the movement of the slide outputted from the angle detector, the top dead center can be easily and rapidly detected as compared with an arrangement where the top dead center is detected by, for instance, inching the slide.

BRIEF DESCRIPTION OF DRAWING(S)

DESCRIPTION OF EMBODIMENT(S)

An exemplary embodiment of the invention will be described below with reference to the attached drawings.

Figure 1:
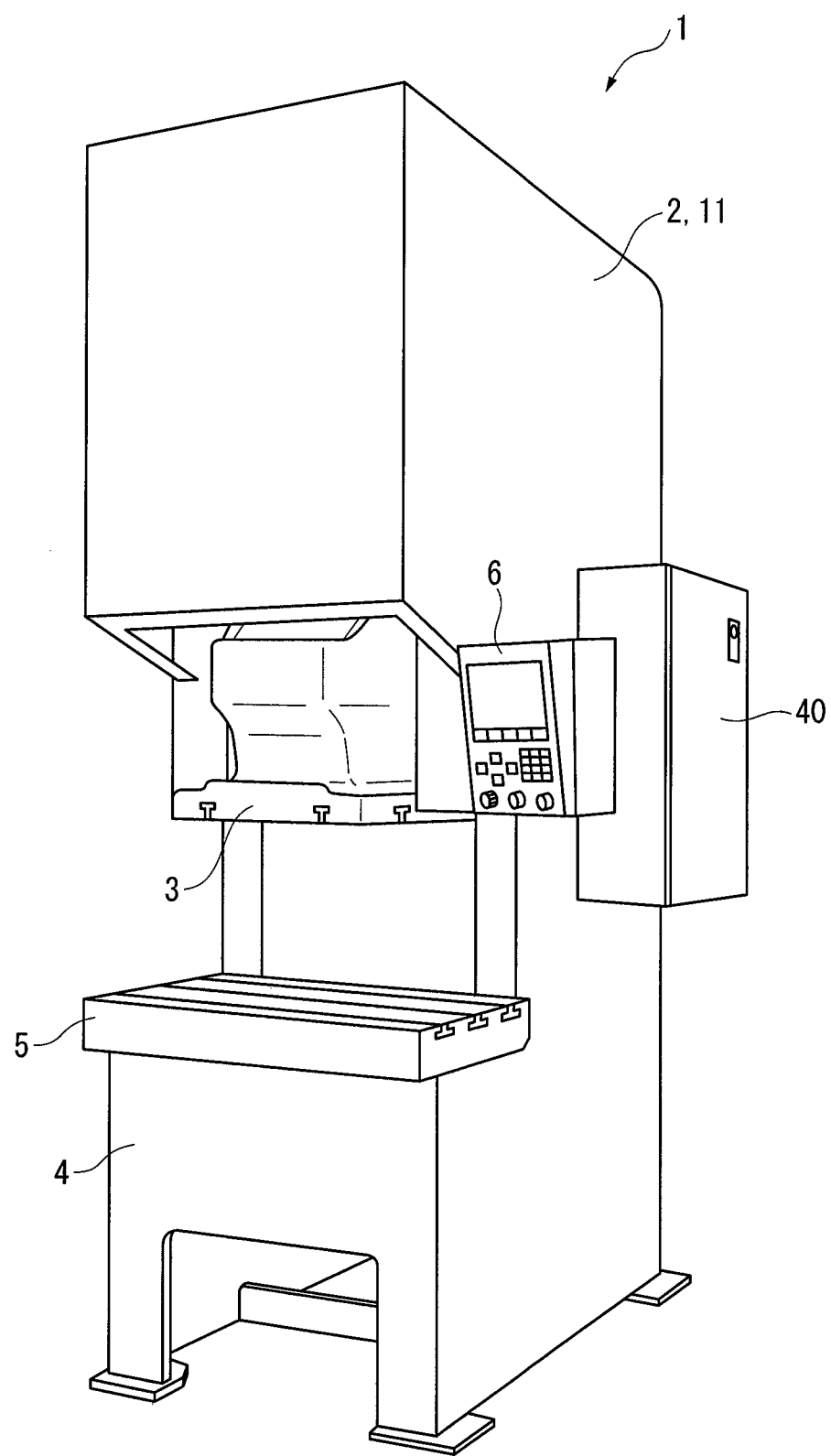
FIG. 1 is a perspective view schematically showing the entirety of a press machine according to an exemplary embodiment of the invention.

First, with reference to FIGS. 1 to 3, description will be made on a servo press 1 that is an example of a press machine according to the exemplary embodiment. The servo press 1 is not provided with a plunger. FIG. 1 is a perspective view showing the entirety of the servo press 1, FIG. 2 is a sectional side elevation showing a relevant part of the servo press 1, and FIG. 3 is a plan view of a partial section showing another relevant part.

As shown in FIG. 1, the servo press 1 includes: a body frame 2; a slide 3 supported substantially at a center of the body frame 2 in a vertically movable manner; a bed 4; and a bolster 5 that is located below the slide 3 and fixed on the bed 4. A control panel 6 (described later) is provided at a front of the body frame 2, and a controller 40 to which the control panel 6 is connected is provided at a side of the body frame 2.

Figure 2:
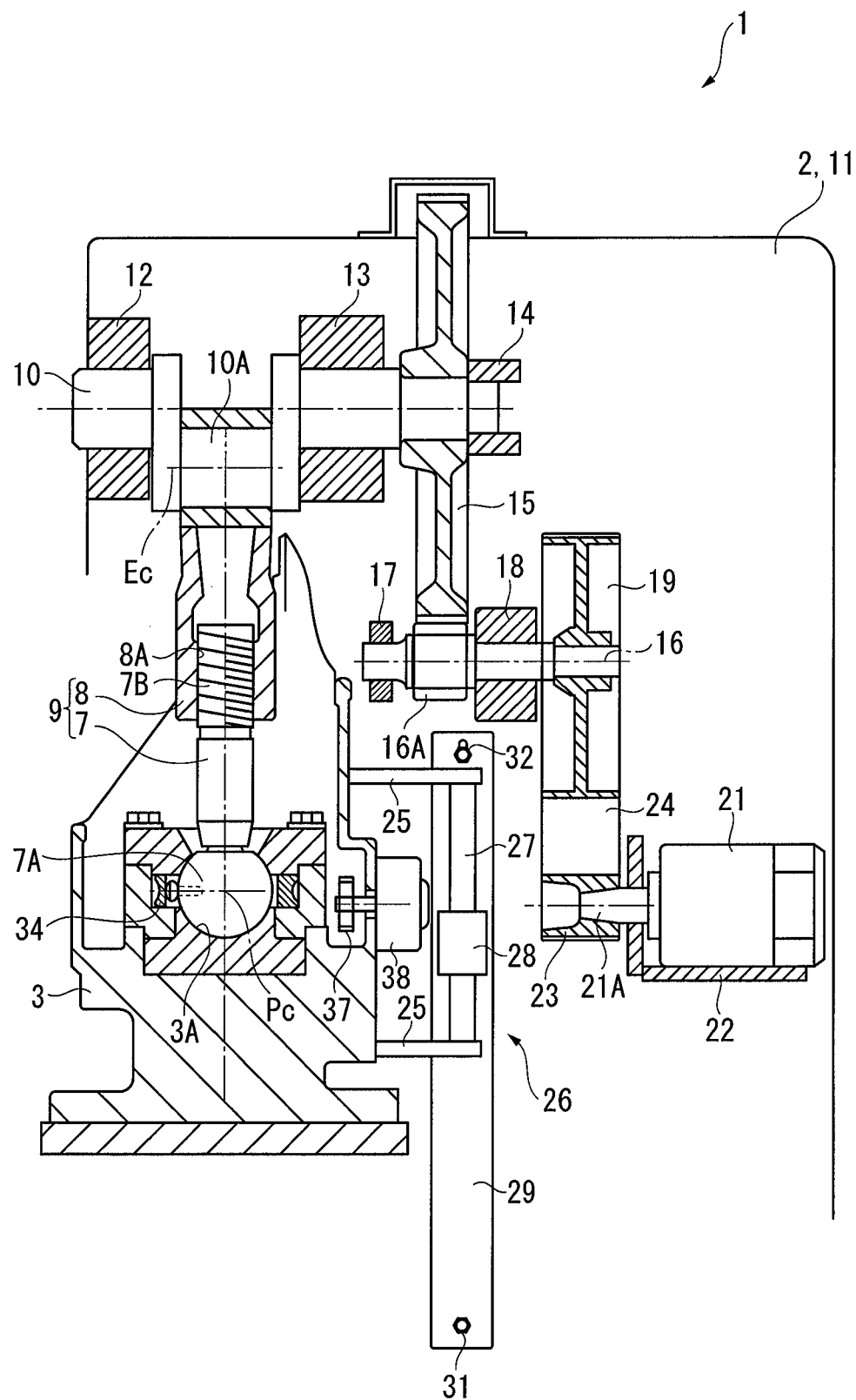
FIG. 2 is a sectional side elevation showing a relevant part of the press machine.
Figure 3:
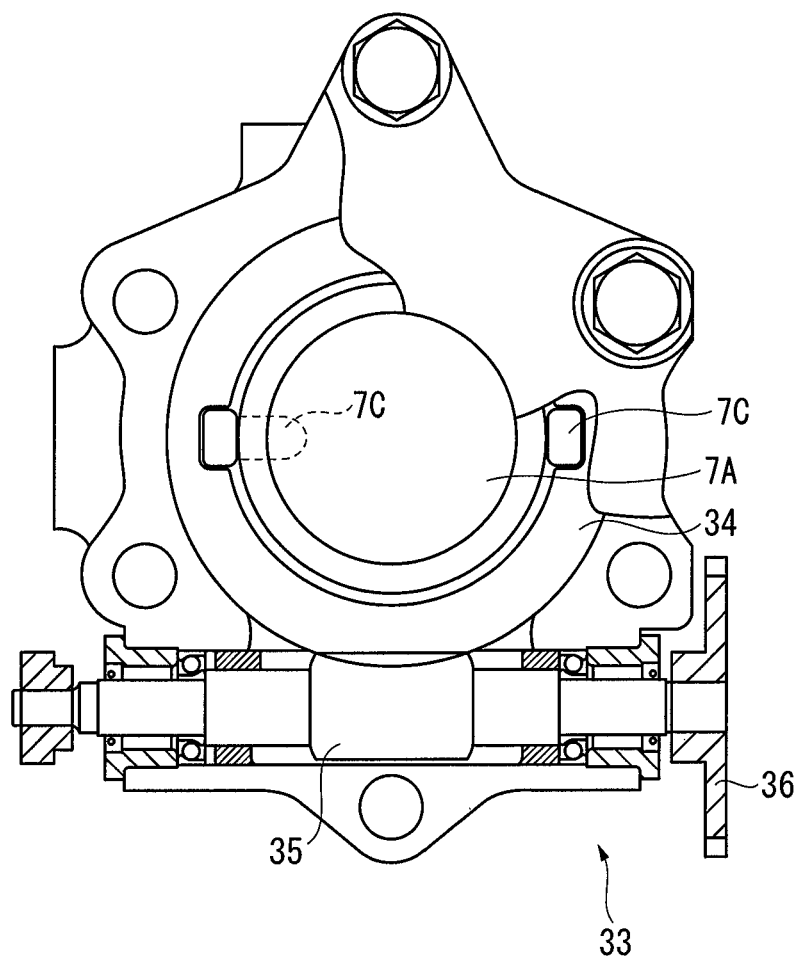
FIG. 3 is a plan view of a partial section showing another relevant part of the press machine.

As shown in FIG. 2, the servo press 1 uses a servo motor 21 to drive the slide 3. In a spherical hole 3A formed in a top of the slide 3, a sphere 7A provided at a lower end of a screw shaft 7 used to adjust a die height is rotatably inserted while prevented from falling out. The spherical hole 3A and the sphere 7A in combination provide a spherical joint. A thread 7B of the screw shaft 7 is exposed upward from the slide 3 and screwed on a female thread 8A of a connecting rod body 8 located above the screw shaft 7. The screw shaft 7 and the connecting rod body 8 in combination provide an extendable connecting rod 9.

An upper portion of the connecting rod 9 is rotatably connected to a crank-shaped eccentric portion 10A provided to a main shaft 10. The main shaft 10 is supported between a lateral pair of thick plate-shaped side frames 11 of the body frame 2 by bearings 12, 13 and 14 at three positions in a front-rear direction. A main gear 15 is attached on a rear portion of the main shaft 10.

The main gear 15 is meshed with a transmission gear 16A of a power transmission shaft 16 located therebelow. The power transmission shaft 16 is supported between the side frames 11 by bearings 17 and 18 at two positions in the front-rear direction. A rear end of the power transmission shaft 16 is attached with a driven pulley 19. The pulley 19 is driven by the servo motor 21 located therebelow.

The servo motor 21 is supported between the side frames 11 via a substantially L-shaped bracket 22. An output shaft 21A of the servo motor 21 protrudes along the front-rear direction of the servo press 1 and power is transmitted via a belt 24 wound around a driver pulley 23 provided on the output shaft 21A and the driven pulley 19.

A rear surface of the slide 3 is attached with a pair of brackets 25 that are located at two vertical positions and protrude rearward to a space between the side frames 11, and a rod 27 of a position detector 26 (e.g., a linear scale) is attached between these vertical brackets 25. The rod 27, which is provided with a scale for detecting a vertical position of the slide 3, is fittingly inserted through a position sensor 28 of the position detector 26 in a vertically movable manner. The position sensor 28 is fixed to an auxiliary frame 29 provided to one of the side frames 11.

The auxiliary frame 29 is vertically elongated. A lower portion of the auxiliary frame 29 is attached to the side frame 11 with a bolt 31 while an upper portion thereof is supported by a bolt 32 inserted in a vertically elongated hole in a vertically slidable manner. Since only one of the upper and lower portions of the auxiliary frame 29 (the lower portion in this exemplary embodiment) is fixed and the other portion is supported in a vertically movable manner as described above, the auxiliary frame 29 is not influenced by expansion and contraction resulting from a temperature change of the side frame 11. Thus, the position sensor 28 is adapted to accurately detect a slide position and a die-height position without being influenced by such expansion and contraction of the side frame 11.

The slide position of the slide 3 and die height are adjusted by a slide-position adjustment mechanism 33 provided in the slide 3. As also shown in FIG. 3, the slide-position adjustment mechanism 33 includes a worm wheel 34 attached on an outer circumference of the sphere 7A of the screw shaft 7 with a pin 7C; a worm gear 35 engaged with the worm wheel 34; an input gear 36 attached to an end of the worm gear 35; and an induction motor 38 provided with an output gear 37 engaged with the input gear 36. The induction motor 38 is in a compact flat shape having a short axial length.

The control panel 6, which is used to input various types of data for setting a slide motion, includes switch and numeric keypad for inputting motion data as well as a display showing the inputted data, registered set data and the like. The display may be a so-called touch-panel-attached programmable display including a clear touch switch panel that is mounted on a front surface of a graphic display (e.g., a liquid crystal display and a plasma display). Incidentally, the control panel 6 may further include a data input device for data from an external storage (e.g., an IC card) that stores preset motion data or a communication device capable of data reception and transmission by wireless or via communication lines.

With the control panel 6 according to the exemplary embodiment, it is possible to selectively set four processing patterns, i.e., slide-control patterns, such as rotation, reverse rotation, reciprocation (a reciprocation through the bottom dead center) and reverse reciprocation (a reciprocation through the top dead center), in accordance with formation conditions. Further, it is designated in the form of motion data whether a height of the slide 3 is displayed as an actual value obtained by the position detector 26 or a value obtained through a later-described calculation in accordance with the processing pattern.

A motion in the "rotation" pattern of the control patterns is performed by rotating the main shaft 10 only in a normal rotation direction in the same manner as in a pattern of a typical press machine. Specifically, according to this pattern, the slide 3 is moved from and returned to the top dead center through the bottom dead center per one shot to a workpiece.

In the "rotation reciprocation" pattern, the slide 3 is normally moved from the top dead center in the same manner as in the above pattern, stopped at a processing-end position located before the bottom dead center, and then reversely rotated from the processing-end position to the top dead center per one shot to a workpiece. Subsequently, the slide 3 is reversely moved from the top dead center, stopped at another processing-end position located before the bottom dead center, and then normally rotated from the processing-end position to the top dead center per one shot to the next workpiece. In short, the normal rotation and reverse rotation of the main shaft 10 are alternately repeated per each workpiece.

According to either of the above patterns, the slide is started to move from the top dead center. In contrast, according to the "reverse" pattern and the "reciprocation" pattern, the slide is started to move from the waiting position displaced from the top dead center. These patterns are frequently accompanied by problems in adjustment of the height of the slide 3 and adjustment of a die height. Since the invention aims to solve such problems, these control patterns will be described below in detail to make the invention well understood.

Figure 4:
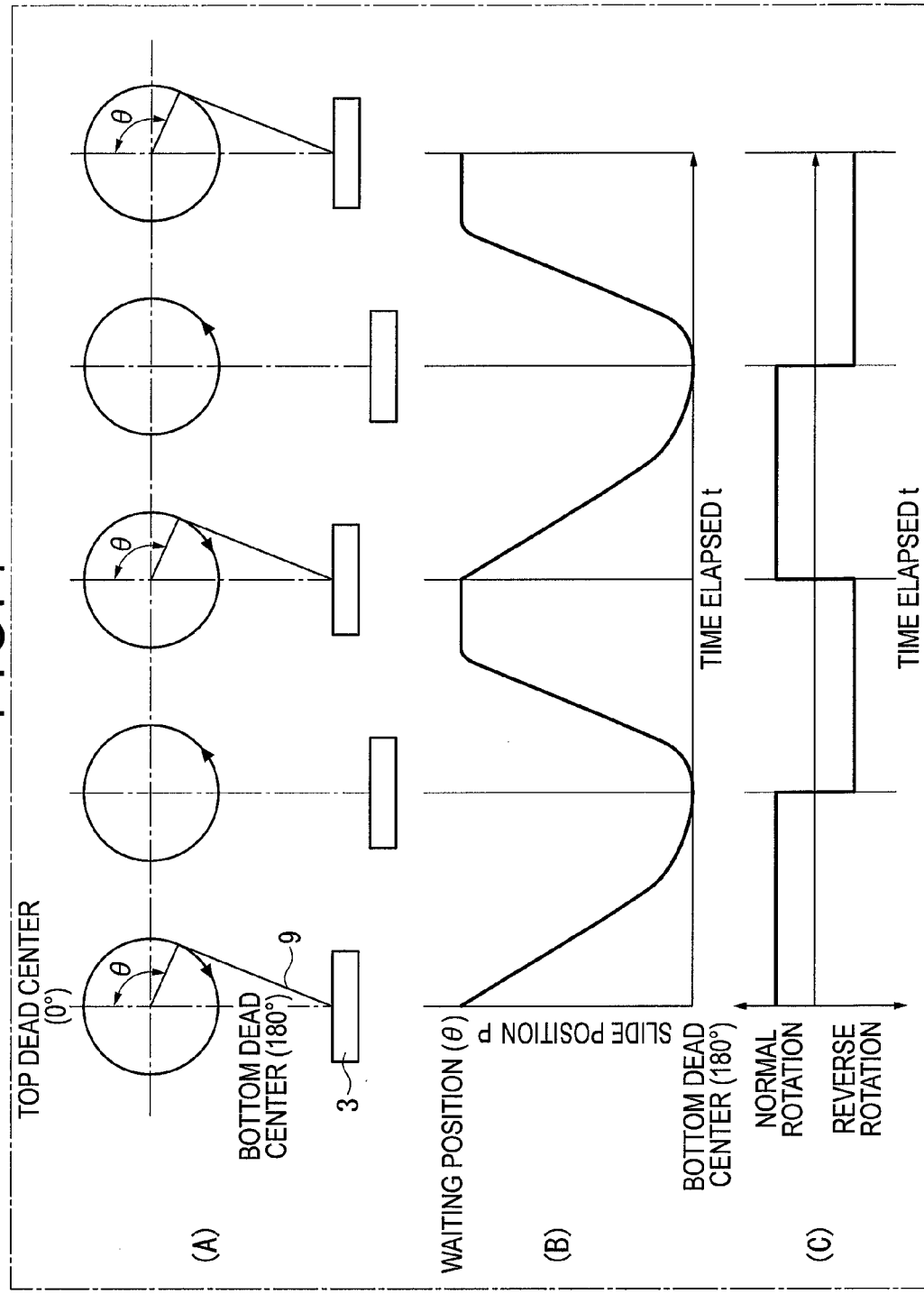
FIG. 4 is a view for explaining a typical motion performed in the press machine.

(A) in FIG. 4 shows a motion of the slide 3 in the "reverse" pattern performed when two workpieces are sequentially subjected to a pressing operation. (B) in FIG. 4 shows a slide position P of the slide 3 that changes as time t elapses (i.e., a slide motion). (C) in FIG. 4 shows a rotation direction of the main shaft 10 that changes as time t elapses in the form of a time chart.

According to the "reverse" pattern, the slide 3 is started to move not from the top dead center (0 degrees) but from the waiting position displaced from the top dead center in the normal rotation direction by the angle θ (a crank angle of the eccentric portion 10A of the main shaft 10). By normally rotating the main shaft 10, the slide 3 is moved downward to the bottom dead center (180 degrees), or moved downward to a position before the bottom dead center and immediately stopped when the pressing operation is completed with the slide 3 being at this position. In either case, the slide 3 is returned to the initial waiting position from the bottom dead center or such a lower position before the bottom dead center by rotating the main shaft 10 after the rotation direction thereof is switched to the reverse rotation direction. Such a process is repeated.

Figure 5:
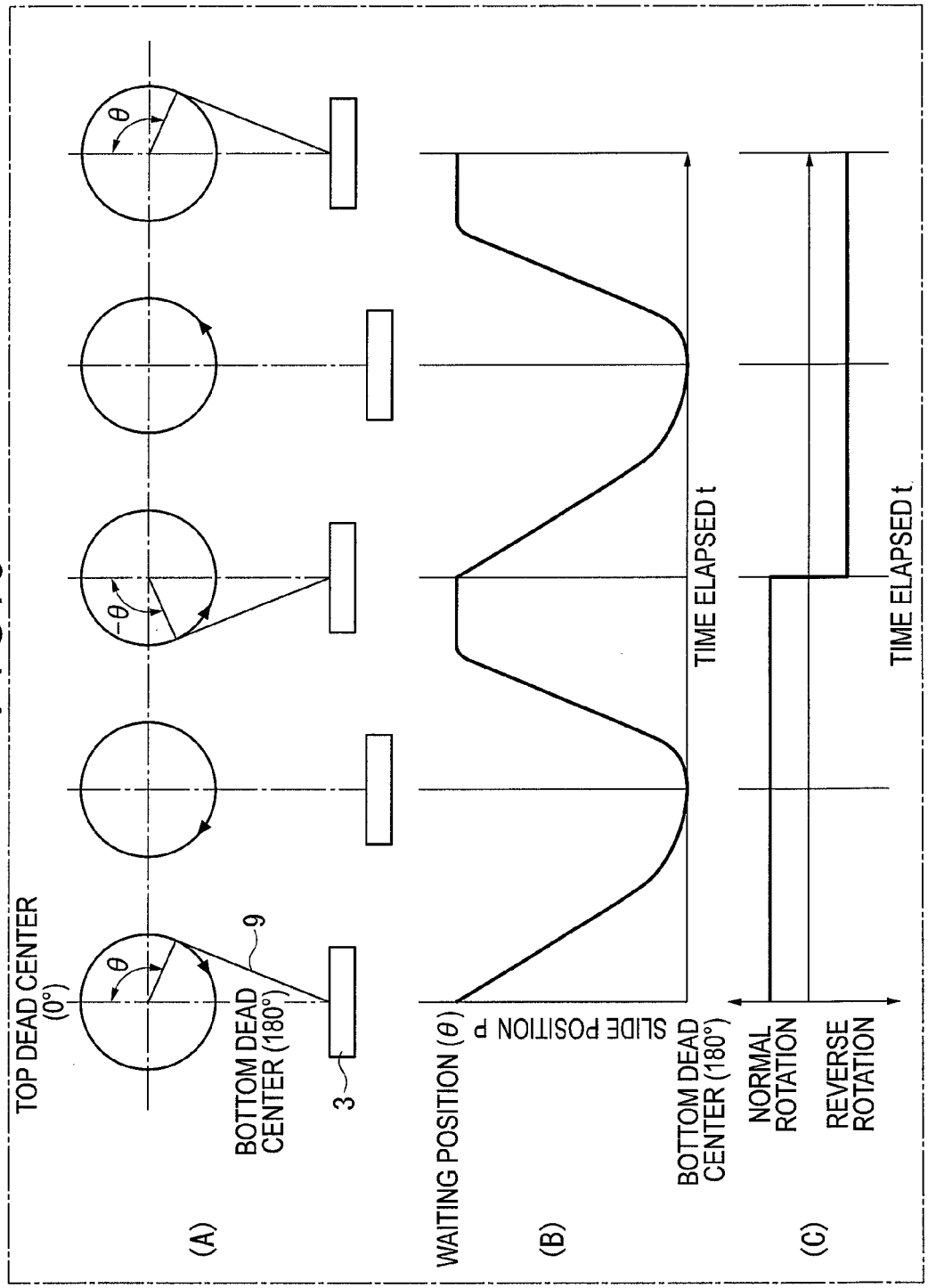
FIG. 5 is a view for explaining another typical motion performed in the press machine.

(A) to (C) in FIG. 5 show a motion of the slide 3, a slide motion, and a time chart of a rotation direction of the main shaft 10 according to the "reciprocation" pattern, respectively.

According to the "reciprocation" pattern, the slide 3 is likewise started to move not from the top dead center (0 degrees) but from the waiting position displaced from the top dead center in the normal rotation direction by the angle θ (a crank angle of the eccentric portion 10A of the main shaft 10). By normally rotating the main shaft 10, the slide 3 is moved downward, and then moved upward to a position displaced from the top dead center by an amount corresponding to the angle minus θ after passing through the bottom dead center (180 degrees), thereby completing the pressing operation on one workpiece. The slide 3 is then kept waiting at the position displaced by the amount corresponding to the angle minus θ until the pressing operation on the next workpiece is started. Such a process is repeated.

For the pressing operation on the next workpiece, by reversely rotating the main shaft 10, the slide 3 is moved downward from the position corresponding to the angle minus θ, and moved upward to the initial waiting position displaced from the top dead center by an amount corresponding to the angle θ after passing through the bottom dead center (180 degrees), thereby completing the pressing operation on the next workpiece. Such a process is repeated.

Incidentally, as shown in FIGS. 4 and 5, by adjusting an angular velocity of the rotation of the serve motor 21 through a servo control, a slide speed of the downward motion to the bottom dead center is set slower while a slide speed of the upward motion to the top dead center is made faster. Obviously, when the servo motor 21 is constantly rotated, the slide motion can be shown as a sine curve.

The slide-control patterns as described above are inputted using the control panel 6. Description will be made hereinbelow on the controller 40 to which the control panel 6 is connected.

Figure 6:
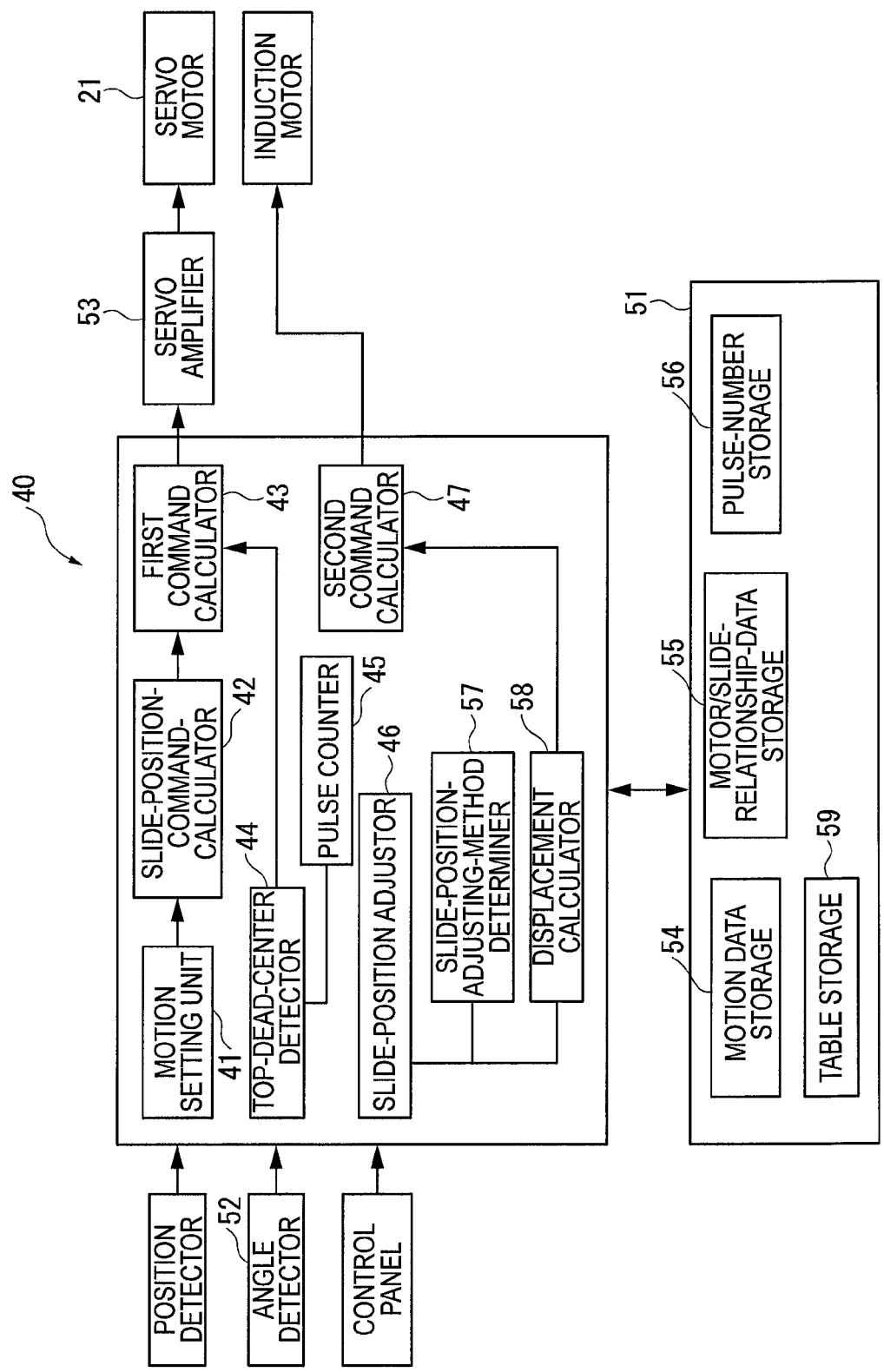
FIG. 6 is a block diagram showing an arrangement of the press machine.

FIG. 6 is a block diagram showing a relevant part of the controller 40. As shown in FIG. 6, the controller 40 is adapted to, for instance, control the servo motor 21 for driving the slide 3 by feedback control and control the induction motor 38 of the slide-position adjustment mechanism 33. The controller 40 includes a microcomputer or a high-speed numerical processor as a main component thereof, a computer that performs arithmetic operation and/or logical operation on inputted data in accordance with a predetermined process, and an output interface that outputs a command current (a detailed illustration of the controller 40 is omitted).

According to the exemplary embodiment, the controller 40 includes a motion setting unit 41, a slide-position-command calculator 42, a first command calculator 43, a top-dead-center detector 44, a pulse counter 45, a slide-position adjustor 46 and a second command calculator 47. Additionally, the controller 40 further includes a storage 51 that may be an appropriate storage medium such as ROM and RAM.

The controller 40 is connected not only to the above-described control panel 6 but also to the above-described position detector 26 such as a linear scale that detects the height of the slide 3, an angle detector 52 such as an crank encoder that detects a rotation angle of the main shaft 10, and the induction motor 38. Additionally, the controller 40 is also connected to the servo motor 21 via a servo amplifier 53.

The motion setting unit 41 of the controller 40 determines motion data representing a relationship between the time t and the slide position P associated with execution of the control based on the control pattern selected and inputted using the control panel 6 and the motion data associated with this control pattern, and stores the determined motion data in a motion-data storage 54 of the storage 51.

In order to accurately move the slide 3 in accordance with the respective motions associated with the normal rotation and the reverse rotation of the main shaft 10 (i.e., the normal rotation and the reverse rotation of the servo motor 21) depending on the control pattern determined by the motion setting unit 41, the slide-position-command calculator 42 calculates a target value of the slide position P per a predetermined periodic time t of servo calculation based on the motions. The slide-position-command calculator 42 outputs the calculated target value of the slide position to the first command calculator 43.

In order to reduce a difference between the target value of the slide position outputted from the slide-position-command calculator 42 and a slide position detected by the position detector 26, the first command calculator 43 calculates a motor speed command for the servo motor 21 based on the difference and outputs it to the servo amplifier 53. Incidentally, a positional difference gain used to calculate the motor speed command is corrected in accordance with the slide position with reference to relationship data between the slide position and the motor rotation angle stored in a motor/slide-relationship-data storage provided in the storage 51.

The top-dead-center detector 44 is provided with functions to detect the top dead center after the servo press 1 is switched on, move the slide 3 to the top dead center, and detect the slide position corresponding to the top dead center through the position detector 26.

Since the angle detector 52 according to the exemplary embodiment uses a pulse output crank encoder, the pulse counter 45 counts the number of pulses outputted from the angle detector 52 and stores it in a pulse-number storage 56 provided in the storage 51.

The slide-position adjustor 46 is activated, for instance, when a follow-up adjustment in which the slide position is automatically adjusted or manually adjusted by an inching operation is performed, for instance, for an experimental pressing of a workpiece with a die attached thereon. The slide-position adjustor 46 includes a slide-position-adjusting-method determiner 57 and a displacement calculator 58.

The slide-position-adjusting-method determiner 57 is provided with a function to determine whether the slide position is automatically or manually adjusted depending on an input by an operator.

In order to change the die height through an automatic adjustment, the displacement calculator 58 calculates a displacement of the slide 3 from the current position of the slide 3 in accordance with a desired value of the die height inputted using the control panel 6, and outputs a target value of the slide position based on the calculated displacement to the second command calculator 47.

In order to move the slide 3 to a target position in accordance with the target value of the slide position outputted from the displacement calculator 58, the second command calculator 47 outputs a command current to the induction motor 38. In contrast, in order to manually adjust the die height, a command current generated by operating an operation button (not shown) provided on the control panel 6 is outputted to the induction motor 38 to move the slide 3. Incidentally, the die height after the slide 3 is moved is displayed on the control panel 6.

Among the above-described functional units, the top-dead-center detector 44 and the displacement calculator 58 will be described in further detail below with reference to FIGS. 7 and 8.

When a press machine has a slide that is always started to move from the top dead center, a waiting position of the slide is the top dead center, so that it is not necessary to again detect the top dead center. In contrast, since a waiting position can be displaced from the top dead center by the amount corresponding to the predetermined angle θ in the servo press 1 according to the exemplary embodiment, a value detected by the position detector 26 with the slide 3 kept waiting at the waiting position can be different from a value detected with the slide 3 being at the top dead center.

Thus, while the currently set die height can be usually calculated by detecting the position of the slide 3 corresponding to the top dead center and subtracting the double of the radius of the crank (a fixed value) from the detected value, when the slide is kept waiting at a position displaced by the amount corresponding to the angle θ, the currently set die height cannot be obtained simply by subtracting the double of the radius of the crank from the value detected by the position detector 26 at the time when the slide is set at the waiting position.

The currently set die height is a reference for changing the die height. Thus, since the displacement of the slide 3 is calculated from the currently set die height and the die height is adjusted to a new value based on the calculated displacement, it is important to accurately detect the currently set die height. Specifically, it is important to tentatively move the slide 3 to the top dead center to calculate the current die height based on the detection by the position detector 26.

The displacement can be calculated from a difference between the accurately calculated current die height and a new desired die height. However, when the slide 3 is started to move from the waiting position displaced by the amount corresponding to the angle θ, a new die height cannot be accurately set by simply moving the slide 3 by the displacement calculated from the difference between the current die height and the new die height.

In view of the above, according to the exemplary embodiment, the top-dead-center detector 44 is provided so that the slide 3 is moved to the top dead center and the current die height is accurately calculated. Additionally, even when the slide 3 is moved from the first waiting position displaced by the amount corresponding to the angle θ, the displacement calculator 58 serves to calculate an accurate displacement, so that the current die height can be accurately adjusted to a new die height by moving the slide by the calculated displacement.

Figure 7:
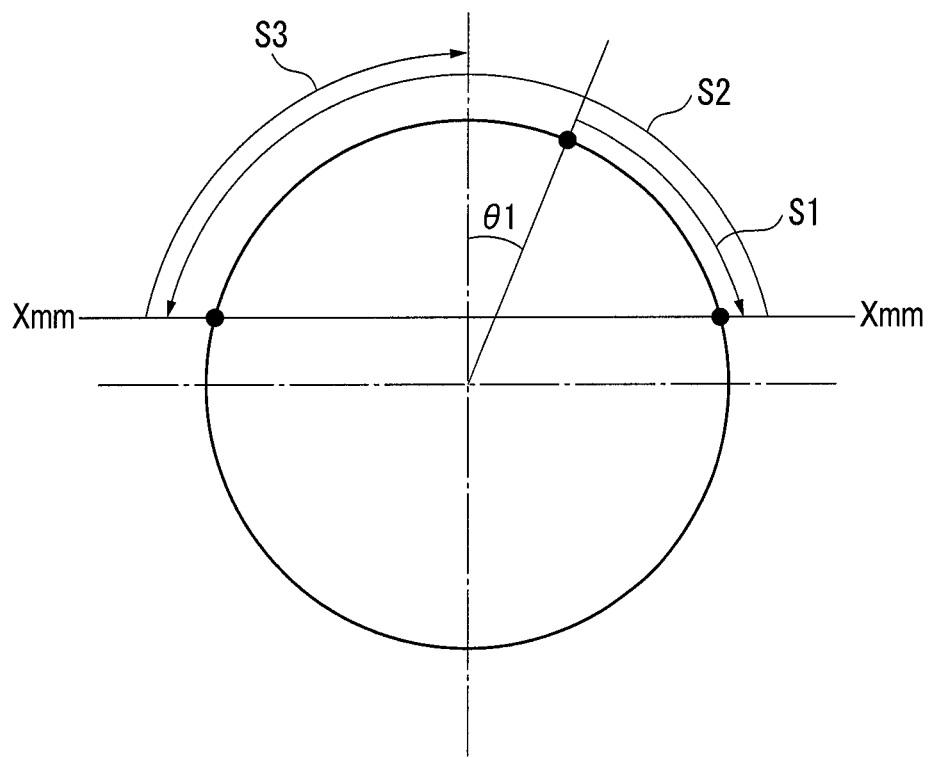
FIG. 7 is a view for explaining detection of a top dead center in the press machine.

As shown in an explanatory diagram of FIG. 7, when the servo press 1 is switched on, the slide 3, which is stopped with the main shaft 10 being rotated by an angle, is moved. Specifically, the top-dead-center detector 44 controls the servo motor 21 to normally rotate the main shaft 10 until the angle detector 52 detects a detection value of 0 degrees. However, since the position of 0 degrees is likely to be displaced from the accurate top dead center (e.g., by an angle θ1), a slide position corresponding to 0 degrees is first detected by the position detector 26, a first target position xmm is calculated by adding a predetermined value to the detected value, and the main shaft 10 is driven until the slide 3 actually reaches the first target position xmm (Step 1: hereinafter "Step" is abbreviated as "S").

Next, the main shaft 10 is reversely rotated to move the slide 3 to the corresponding slide position on the reverse rotation side (i.e., a second target value xmm). Additionally, the number of pulses outputted from the angle detector 52 is counted by the pulse counter 45 during a period from the start to the stop of the reverse rotation of the main shaft 10 and stored in the pulse-number storage 56 (S2).

Subsequently, the main shaft 10 is normally rotated by half of the stored number of pulses. The main shaft 10 is stopped when the number of pulses reaches this predetermined number. In this manner, the position of the slide 3 with the main shaft 10 being stopped is detected as the accurate top dead center (S3).

Incidentally, since the angle of the main shaft 10 per one pulse is sufficiently small, when the number of pulses stored in S1 is an odd number, the angle corresponding to 0.5 pulses obtained when the number of pulses is halved may be rounded up or rounded down. In order to achieve a higher accuracy, a value obtained when the angle of the main shaft 10 per one pulse is halved may be taken into consideration.

Figure 8:
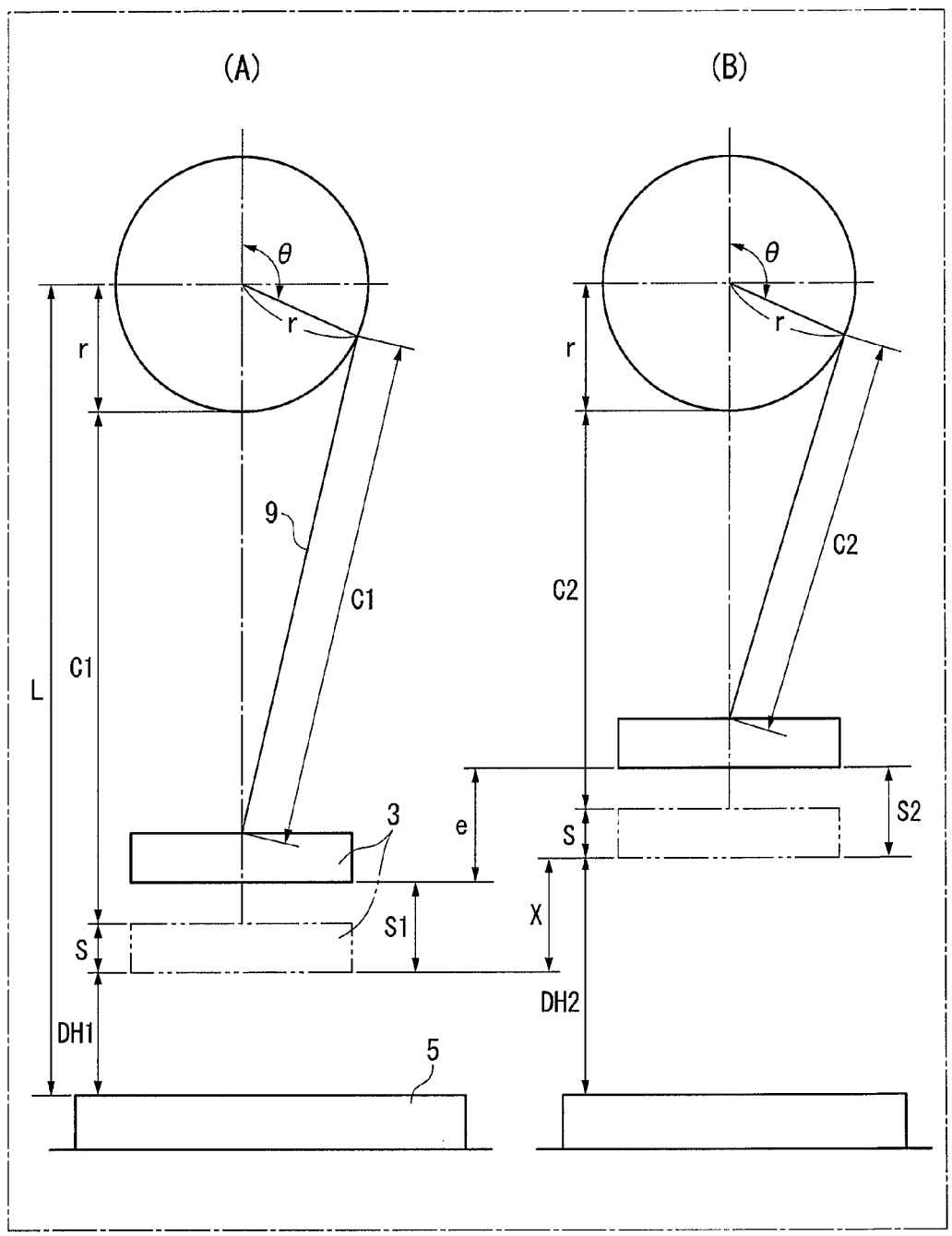
FIG. 8 is a view for explaining adjustment of a die height in the press machine.

With reference to FIG. 8, the displacement calculator 58 will be described in detail. In an explanatory diagram of FIG. 8, the waiting position of the slide 3 in (A) is displaced from the top dead center by the amount corresponding to the angle θ and a die used therein has a die height DH1 (current setting). Under the above setting, the "reverse" pattern or the "reciprocation" pattern can be selected from among the above-described control patterns.

In contrast, (B) shows a setting for a new die having a die height DH2. Since the waiting position is likewise displaced from the top dead center by the amount corresponding to the angle θ, the "reverse" pattern or the "reciprocation" pattern can be selected from among the above-described control patterns.

When reference characters in the figure denote as follows, relationships represented by Equations (1) to (6) are established between (A) and (B), and a difference X between the die heights in (A) and (B) can be represented by Equation (7), i.e., a function using the angle θ, the die height DH1, and a slide displacement e required to reach the waiting position displaced by the amount corresponding to the angle θ.

r: a crank radius (mm) . . . fixed value
L: a distance from the upper surface of a bolster to the crank center (mm) . . . fixed value
S: a distance from the lower surface of the slide to a point center (mm) . . . fixed value
θ: a crank angle (deg) . . . measured value
DH1: a die height before adjustment (mm) . . . measured value
e: a slide displacement accompanying adjustment of the die height (mm) . . . calculated value
C1: a connecting rod length including the screw shaft before adjustment (mm) . . . calculated value
C2: a connecting rod length including the screw shaft after adjustment (mm) . . . calculated value
S1: a slide-position difference between the waiting position and the bottom dead center before adjustment (mm) . . . calculated value
S2: a slide-position difference between the waiting position and the bottom dead center after adjustment (mm) . . . calculated value
X: a die-height difference between before and after adjustment, i.e., an extension/contraction amount of the connecting rod (mm) . . . calculated value
DH2: a die height after adjustment (mm) . . . calculated value Incidentally, since a table corresponding to a trigonometric function per unit angle (one degree) is stored in the table storage 59 of the storage 51, a value of cos θ is provided as a fixed value. The table includes only the values corresponding to 90 degrees or smaller and thus values corresponding to 91 to 359 degrees are calculated. The angle θ is a measured value obtained by the angle detector 52 and the slide displacement e is a measured value obtained by the position detector 26.

$$C1-C2+S2=S1+e \quad (1)$$

$$S1=r+C1+r\cos\theta-(C1^2-r^2+r^2\cos^2\theta)^{1/2} \quad (2)$$

$$S2=r+C2+r\cos\theta-(C2^2-r^2+r^2\cos^2\theta)^{1/2} \quad (3)$$

Equations (2) and (3) herein are general equations for a crank.

S1 and S2 are removed from Equations (1), (2) and (3) to obtain e.

$$e=(C1^2-r^2+r^2\cos^2\theta)^{1/2}-(C2^2-r^2+r^2\cos^2\theta)^{1/2} \quad (4)$$

Equation (4) is solved in terms of C2.

$$C2=\{(-e+(C1^2-r^2+r^2\cos^2\theta)^{1/2})^2+r^2-r^2\cos^2\theta\}^{1/2} \quad (5)$$

Since $$C1=L-r-S-DH1 \quad (6),$$

$$X=C1-C2=f(\theta,DH1,e) \quad (7).$$

X can be expressed by a function using θ, DH1 and e. Incidentally, DH2=DH1+X

In view of the above, in order to adjust the die height from DH1 to DH2 with the slide 3 being kept waiting at the waiting position displaced from the top dead center by the amount corresponding to the angle θ when the die is replaced with a new one, the slide position corresponding to the top dead center obtained by the function of the top-dead-center detector 44 is first detected by the position detector 26 to calculate the die height DH1 before adjustment in advance.

Next, the calculated DH1 is substituted in Equation (6) to calculate the connecting rod length C1 before adjustment. Each of L, r and S is a fixed value. Since the difference X between the desired die height DH2 and the die height DH1 is equivalent to the extension/contraction of the connecting rod, when C1 and X are calculated, the connecting rod length C2 after adjustment can be calculated by Equation (7). Further, the slide displacement e by which the slide 3 at the waiting position displaced by the amount corresponding to the angle θ needs to be moved can be calculated from C1 and C2 by Equation (4)

Incidentally, a portion connecting the driving mechanism for the slide 3 and the slide 3 is referred to as a point. According to the exemplary embodiment, the point is a portion connecting the connecting rod 9 and the slide 3. However, when the press machine includes a plunger interposed between the connecting rod 9 and the slide 3, the point is a portion connecting the plunger and the slide.

Thus, according to the exemplary embodiment, the point center Pc is the center of a sphere of a spherical joint. The lengths C1 and C2 of the connecting rod 9 each mean a distance from an axial center Ec of the eccentric portion 10A of the main shaft 10 (FIG. 2) to the point center Pc.

The displacement calculator 58 performs the calculation of the slide displacement e. The die height can be accurately adjusted from DH1 to DH2 by moving the slide 3 by the slide displacement e while keeping the slide 3 at the waiting position displaced from the top dead center by the amount corresponding to the angle θ.

With reference to the flow charts of FIGS. 9 to 13, description will be made on a method of calculating the die height DH1 from the top-dead-center position of the slide 3 relative to a currently used die detected by the top-dead-center detector 44, and a method of adjusting the die height from DH1 to DH2 based on the slide displacement e calculated by the displacement calculator 58.

Incidentally, in the following description, it is assumed that a die requiring the die height DH1 has just been replaced with a die requiring the die height DH2. Additionally, it is assumed that control data for the replaced die has already been inputted.

Figure 9:
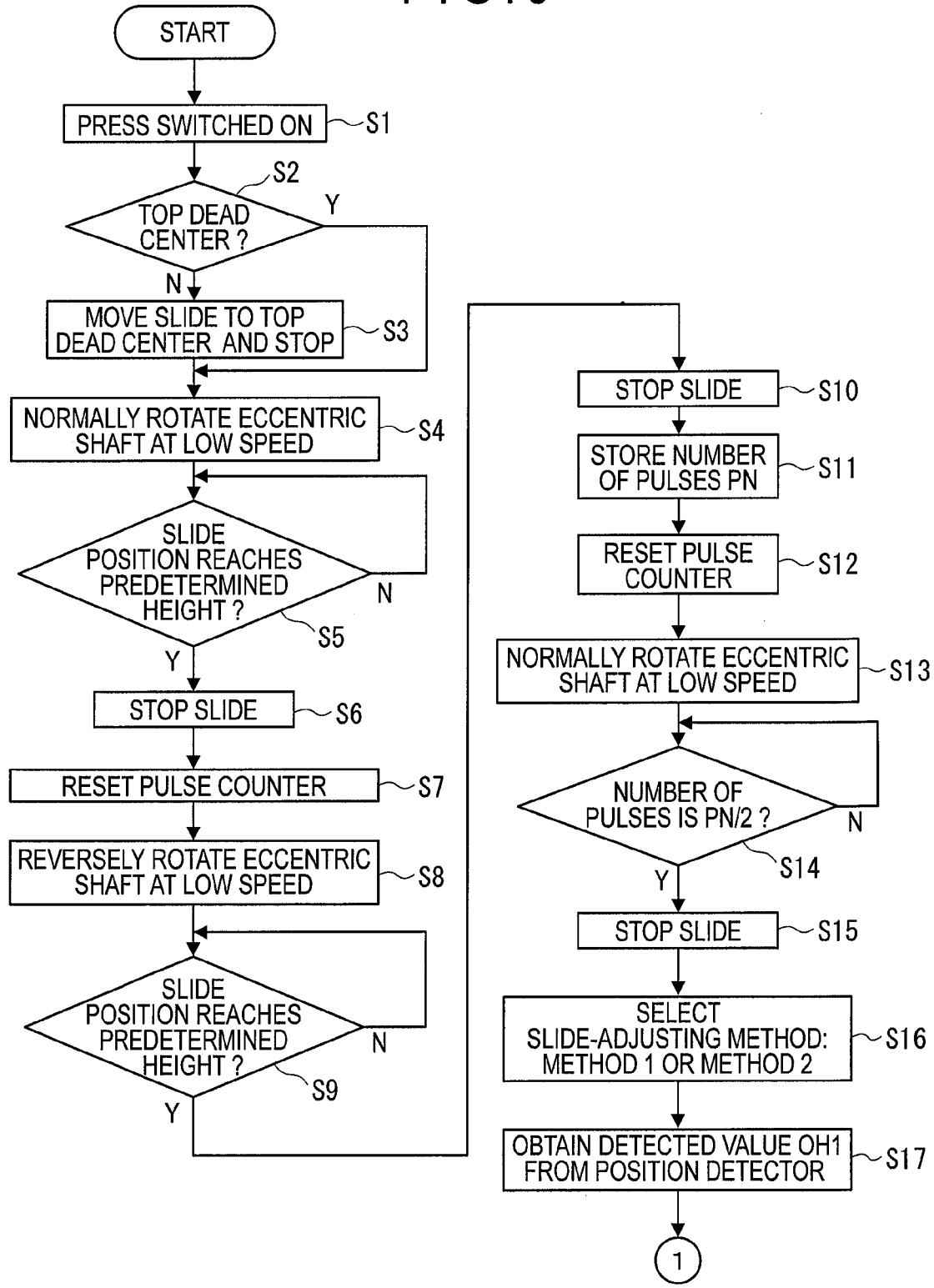
FIG. 9 is a flow chart for explaining the detection of the top dead center and the adjustment of the die height in the press machine.
Figure 10:
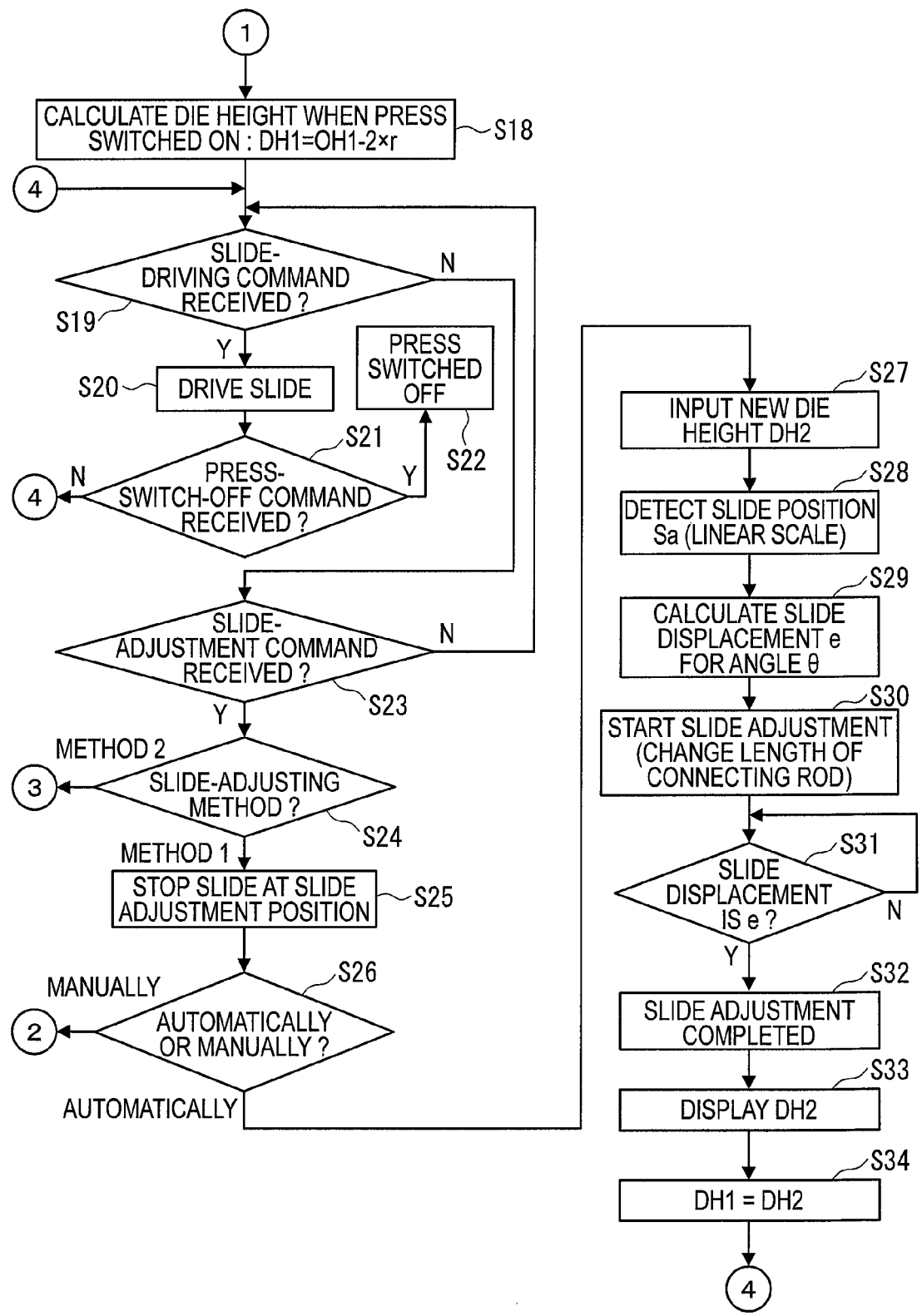
FIG. 10 is a flow chart subsequent to FIG. 9.
Figure 11:
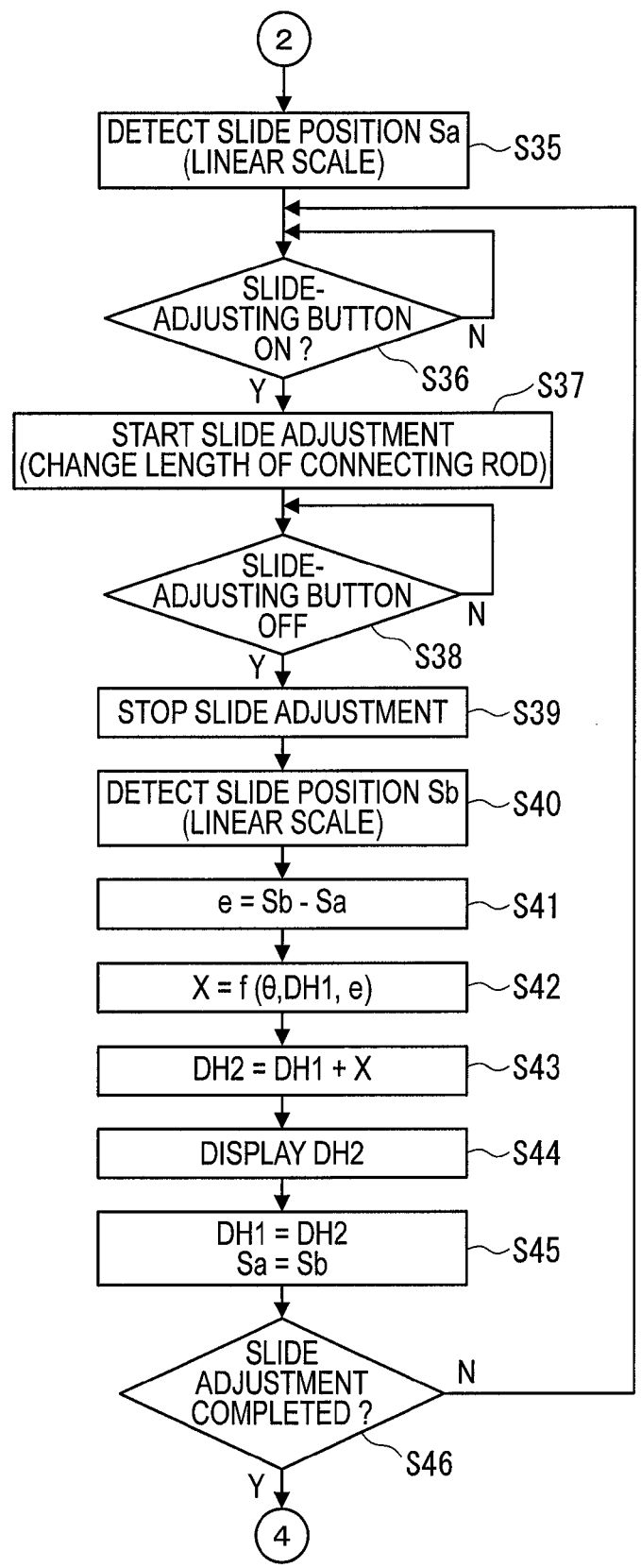
FIG. 11 is a flow chart subsequent to FIG. 10.
Figure 12:
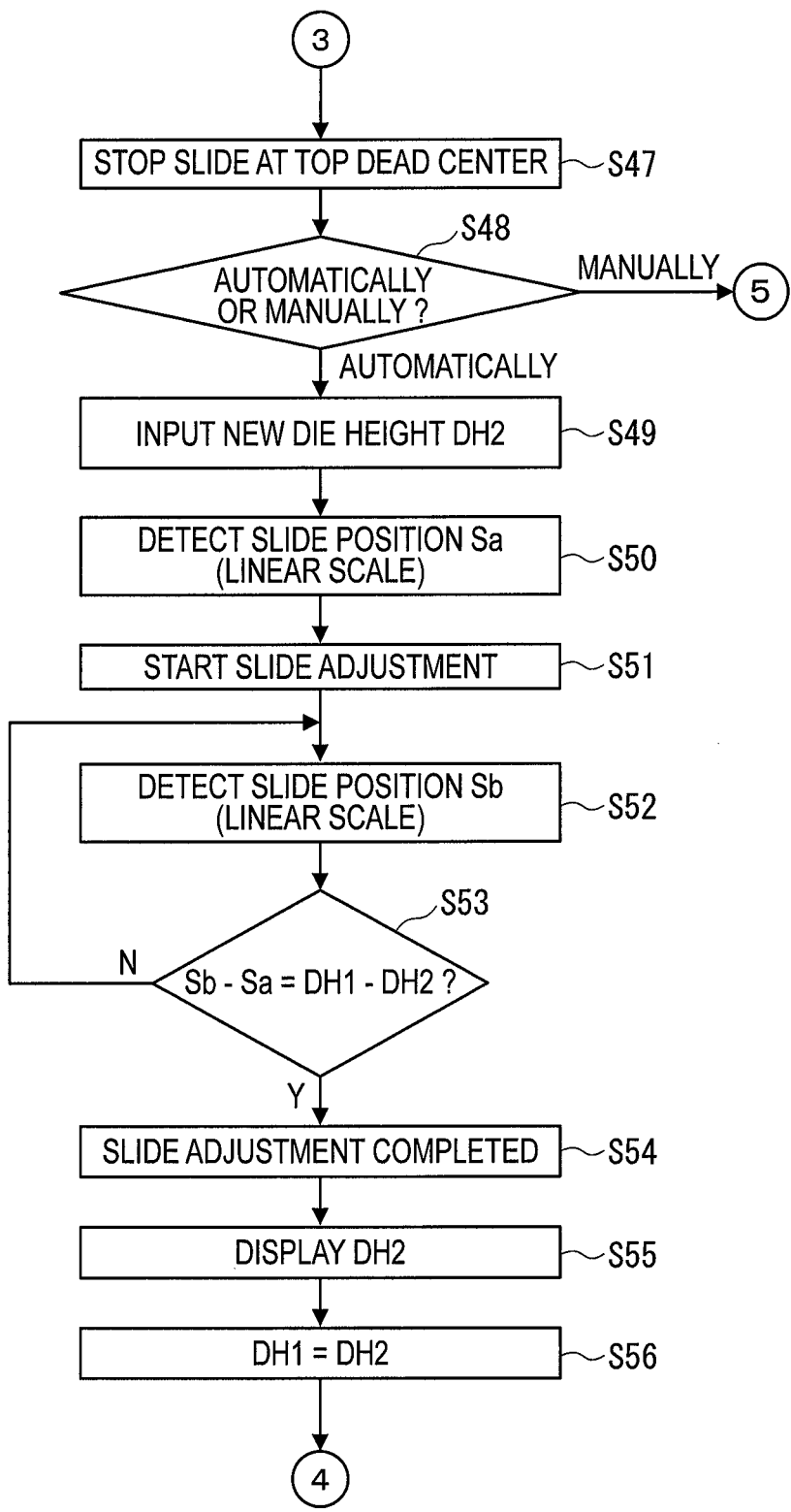
FIG. 12 is another flow chart subsequent to FIG. 10.
Figure 13:
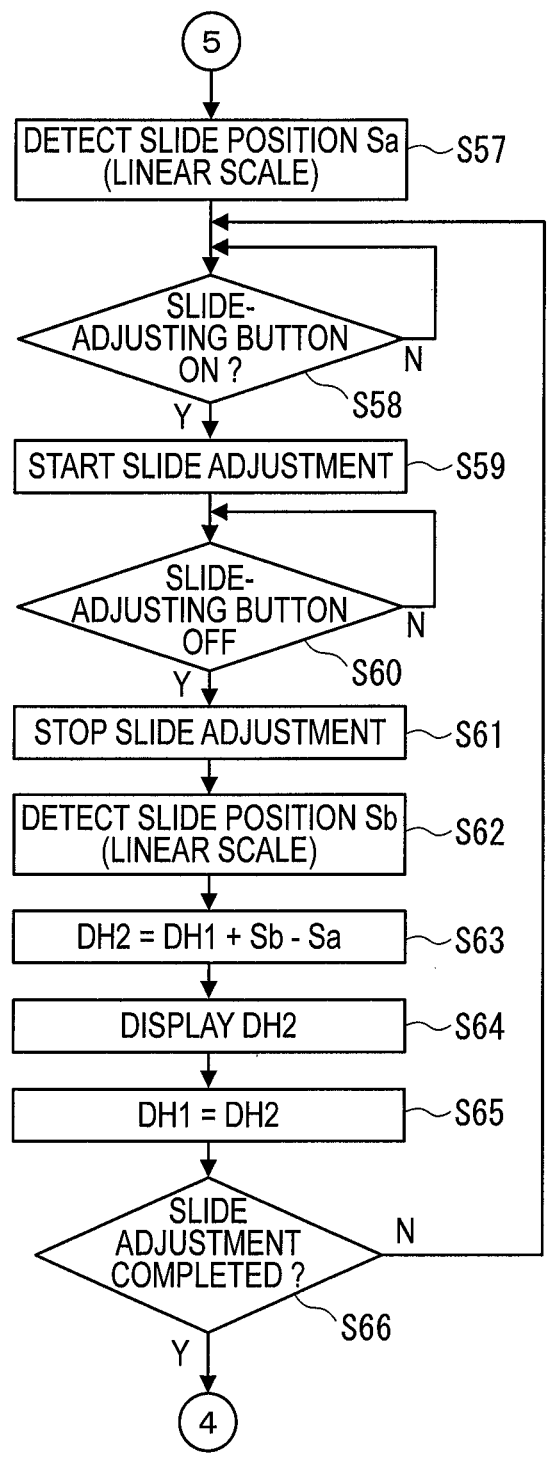
FIG. 13 is a flow chart subsequent to FIG. 12.

As shown in FIG. 9, when the controller 40 is switched on (S1) to start the servo press 1, it is judged whether or not the slide 3 is positioned at the top dead center based on the detected value from the angle detector 52 (S2). When the slide 3 is not positioned at the top dead center, the servo motor 21 is driven to move the slide 3 to the top dead center at a low speed (S3). After the slide 3 reaches the top dead center or when it is judged that the slide 3 is positioned at the top dead center in S2, the main shaft 10 (an eccentric shaft) is normally rotated at a low speed (S4). The normal rotation of the main shaft 10 is continued until the slide position becomes the predetermined height xmm (FIG. 7) (S5 and S6).

When the height of the slide position reaches the predetermined height xmm and the main shaft 10 is stopped, the number of counts in the pulse counter 45 is reset (S7). Next, the main shaft 10 is reversed at a low speed. Simultaneously, the pulse counter 45 starts counting the number of pulses from the angle detector 52 (S8). The reverse rotation of the main shaft 10 is continued until the height of the slide position reaches the predetermined height xmm on the reverse rotation side beyond the top dead center (S9 and S10), and the number of pulses PN is stored in the pulse-number storage 56 (S11).

When the height of the slide position reaches the predetermined height xmm on the reverse rotation side and the main shaft 10 is stopped, the number of counts in the pulse counter 45 is reset (S12). The main shaft 10 is again normally rotated at a low speed from this position, and the pulse counter 45 simultaneously starts pulse counting (S13). The rotation of the main shaft 10 is continued until the counted number of pulses reaches the half of the number of pulses PN (S14 and S15). In this manner, the top dead center can be detected with higher accuracy and the slide 3 can be positioned at the accurate top dead center.

The above-described steps are performed mainly by the functions of the top-dead-center detector 44.

Subsequently, the process proceeds to the positional adjustment of the slide 3. First, the slide-position adjustor 46 determines a slide-adjusting method. The control pattern for a pressing operation to be performed is set in advance using the control panel 6. The slide-position adjustor 46 automatically selects a method 1 for the "reverse" pattern or the "reciprocation" pattern and a method 2 for the "rotation" pattern or the "reverse reciprocation" pattern (S16).

Subsequently, the distance OH 1 from the upper surface of the bolster 5 to the lower surface of the slide 3 positioned at the top dead center is calculated based on the slide position measured by the position detector 26, and the die height DH1, which is currently set, is calculated by subtracting the double of the crank radius r from the calculated distance OH1 (S17 and S18).

The process proceeds to steps for the pressing operation. The slide-position adjustor 46 waits a slide-driving command (S19). When the slide-position adjustor 46 detects a driving command inputted from the control panel 6, the slide 3 is driven (S20). At this time, when the slide-position adjustor 46 detects a switch-off command for switching off the servo press 1 in order to end the slide driving or the like, the servo press 1 is switched off (S21 and S22).

When the slide 3 is not required to be driven from the first in S18, the slide-position adjustor 46 waits an adjustment command for adjusting the slide 3 from the control panel 6 (S23). Since the slide position is usually not adjusted while the slide 3 is driven, S19 is followed by S23. When the adjustment command is detected, the slide-position adjustor 46 selects the slide-adjusting method 1 or 2 (S24).

The slide-adjusting method selected herein is exemplarily the "method 1". Specifically, the waiting position of the slide 3 is displaced from the top dead center by the amount corresponding to the angle θ, and the slide 3 is to be driven in the "reverse" pattern or the "reciprocation" pattern. The slide-position adjustor 46 moves the slide 3 to the waiting position (i.e., the position corresponding to the angle θ) and keeps the slide 3 at the waiting position (S25). The angle θ is read out from prestored motion data associated with each usable die.

Next, the slide-position-adjusting-method determiner 57 determines whether the slide position is automatically or manually adjusted (S26). This determination depends on a selection made by an operator using the control panel 6.

In order to automatically adjust the slide position, the operator inputs a value of the desired die height DH2 using the control panel 6 (S27). In response to the input of the value, the position detector 26 detects a current slide position Sa (S28) and then the displacement calculator 58 calculates the slide displacement e as described above (S29). Further, a target slide position after adjustment is determined by adding the slide displacement e to the current slide position Sa.

When the second command calculator 47 supplies an electric current to the induction motor 38 in accordance with the target slide position, the connecting rod 9 is extended/contracted to move the slide 3 (S30). During the motion of the slide 3, a changing slide position Sb is continuously obtained from the position detector 26 to judge whether or not the slide position Sb reaches the target position, i.e., whether or not the displacement reaches e (S31).

When the slide position reaches the target position, the adjustment of the slide position is completed (S32). On the control panel 6, the new die height DH2 after adjustment is displayed (S33) and the value of the current die height DH1 is updated to the value of the DH2 (S34). Subsequently, the process returns to S19 to drive the slide 3. The die height DH2 in the above process is a calculated value.

When the die height needs to be further adjusted after the slide 3 is driven, the process proceeds S20, S22, S23, S24 and S25, and the manual adjustment of the slide position is selected in S26. In order to perform the manual adjustment, the position detector 26 first detects the current slide position Sa (S35). The operation of a slide-adjusting button by an operator is monitored (S36). As long as the button is operated, an electric current is supplied from the second command calculator 47 to move the slide 3 through the extension/contraction of the connecting rod 9 (S37, S38 and S39).

After the slide 3 is moved, the position detector 26 detects the slide position Sb after the movement of the slide 3 (S40), and the displacement calculator 58 calculates the actual displacement e from a difference between Sa and Sb (S41). Further, an extension/contraction amount X of the connection rod 9 is calculated from the angle θ, the die height DH1 updated before the manual adjustment and the displacement e (S42), the new die height DH2 is calculated by adding the die height DH1 to the calculated extension/contraction amount X (S43), and the calculated die height DH2 is displayed on the control panel 6 (S44). The die height DH2 in the above process is also a calculated value.

Further, the value of the die height DH1 is updated to the value of the die height DH2 and the value of the slide position Sa is updated to the value of Sb (S45). When an operator wishes to manually adjust the slide position again afterward without driving the slide 3, continuation of the adjustment is instructed (S46). In this manner, since the process returns to S36, the start-up adjustment can be repeated. In contrast, when an operator wishes to judge whether or not the slide position should be adjusted after the slide 3 is again driven, the adjustment of the slide position is temporarily ended in S46 and the process returns to S19.

Even when the waiting position of the slide 3 is displaced by the amount corresponding to the angle θ, the slide adjustment accompanying change of the die height may be performed after the slide 3 is moved to the top dead center in the same manner as a typical manner. Even when selected control pattern is the "rotation" or the "reverse reciprocation", since the waiting position is set at the top dead center, the slide 3 needs to be moved to the top dead center before the slide adjustment. The adjustment of the slide position in the above cases will be described below. In S24 in FIG. 9, the method 2 is selected.

First, the slide 3 is stopped at the top dead center (S47). The slide-position-adjusting-method determiner 57 determines whether the slide position is automatically or manually adjusted (S48). When the automatic adjustment is selected, an operator inputs the value of the desired die height DH2 using the control panel 6 (S49). When the value of the die height DH2 is inputted, the position detector 26 detects the current slide position Sa (S50), and then the connecting rod 9 is extended/contracted by the induction motor 38 to move the slide 3 (S51).

During the movement of the slide 3, the changing slide position Sb is continuously obtained from the position detector 26 (S52) and it is judged whether or not a difference between the slide positions Sa and Sb is equal to a difference between the die heights DH1 and DH2 (i.e., the die heights before and after adjustment) (S53). When the difference between the slide positions Sa and Sb becomes equal to the difference between the die heights DH1 and DH2, the movement of the slide 3 is stopped (S54). On the control panel 6, the new die height DH2 after adjustment is displayed (S55) and the value of the current die height DH1 is updated to the value of the DH2 (S56). Subsequently, the process returns to S19 to drive the slide 3. The die height DH2 in the above process is a measured value obtained without using the table of a trigonometric function.

Now, a manual adjustment will be described. For the manual adjustment, the position detector 26 detects the current slide position Sa in the same manner as in the method 1 (S57). The operation of a slide-adjusting button by an operator is monitored (S58). As long as the button is operated, an electric current is supplied from the second command calculator 47 to move the slide 3 through the extension/contraction of the connecting rod 9 (S59, S60 and S61).

After the slide 3 is moved, the position detector 26 detects the slide position Sb after the movement of the slide 3 (S62). The displacement calculator 58 adds the difference between Sa and Sb to the die height DH1 (i.e., the die height before adjustment) to obtain the die height DH2 (i.e., the die height after adjustment) (S63), and displays the die height DH2 on the control panel 6 (S64). The die height DH2 in the above process is a measured value.

Further, the value of the die height DH1 is updated to the value of the DH2 (S65). When an operator wishes to manually adjust the slide position again afterward without driving the slide 3, continuation of the adjustment is instructed (S66). In this manner, since the process returns to S58, the start-up adjustment can be repeated. In contrast, when an operator wishes to judge whether or not the slide position should be adjusted after the slide 3 is again driven, the adjustment of the slide position is temporarily ended in S66 and the process returns to S19.

When the waiting position of the slide 3 is set at the position displaced from the top dead center by the amount corresponding to the angle θ, it is not necessary to move the slide 3 to the top dead center before the adjustment of the slide position that accompanies the change of the die height as described above, resulting in a quick and accurate movement of the slide 3, i.e., change of the die height. Further, since the extension/contraction amount of the connecting rod 9 is not directly detected, the exemplary embodiment does not require a dedicated detector and thus is cost-friendly.

Further, since the top dead center is accurately detected before the die height adjustment, even when the position of the top dead center is slightly displaced during a pressing operation using a previous die (i.e., before the adjustment), the top dead center can be accurately detected. Thus, the die height DH1 can be changed to an appropriate value and the accuracy of subsequent movement of the slide can be improved.

It should be appreciated that the scope of the invention is not limited to the above exemplary embodiment but modifications and improvements that are compatible with an object of the invention are included within the scope of the invention.

For instance, although the slide 3 is hung on one connecting rod 9 (i.e., a one-point slide) in the above exemplary embodiment, the slide 3 may be hung on two connecting rods 9 (i.e., a two-point slide).

In the detection of the top dead center performed by the top-dead-center detector 44 according to the exemplary embodiment, the slide 3 is first moved to the slide position xmm by the normal rotation of the main shaft 10 in S1, and then moved to the slide position on the reverse rotation side in S2. However, the main shaft 10 may be rotated in either direction depending on the degrees of the crank angle at the time when the machine is switched on. For instance, the slide 3 may be first positioned on the reverse rotation side and then rotated to the normal rotation side.

Although the lower end of the connecting rod 9 is directly connected to the slide 3 in the above exemplary embodiment, the invention is applicable to a press machine in which a plunger is interposed between the connecting rod 9 and the slide 3. In this case, the plunger is immobilized by a plunger holder attached to a lower surface of a crown, but movable only in a vertical direction.

The invention claimed is:
1. A press machine comprising:
a slide;
a bolster being located below the slide;
an extendable connecting rod with a lower end that is directly connected to the slide or connected to the slide via a plunger;
a main shaft comprising an eccentric portion to which an upper end of the connecting rod is connected;
a pulse-outputting angle detector being configured to detect a crank angle of the eccentric portion of the main shaft;
a servo motor being adapted to drive the main shaft; and
a controller being configured to control the servo motor, wherein
the controller comprises a top-dead-center detector that is configured to:
rotate the main shaft in a predetermined direction selected from a normal rotation direction and a reverse rotation direction to place the slide at a first position displaced relative to a top dead center of the slide by a predetermined height;
while outputting and counting pulses from the angle detector, rotate the main shaft in a direction opposite to the predetermined direction to move the slide to a second position located at the same height as the first position beyond the top dead center; and
rotate the main shaft from the second position in the predetermined direction by an amount corresponding to a half of the counted pulses to detect the top dead center.

2. A top-dead-center detecting method for a press machine that comprises:
- a slide;
- a bolster located below the slide;
- an extendable connecting rod with a lower end that is directly connected to the slide or connected to the slide via a plunger;
- a main shaft comprising an eccentric portion to which an upper end of the connecting rod is connected;
- a pulse-outputting angle detector being configured to detect a crank angle of the eccentric portion of the main shaft;
- a servo motor being configured to drive the main shaft; and
- a controller being configured to control the servo motor and perform the method, the method comprising:
- rotating the main shaft in a predetermined direction selected from a normal rotation direction and a reverse rotation direction to place the slide at a first position displaced relative to a top dead center of the slide by a predetermined height;
- while outputting and counting pulses from the angle detector, rotating the main shaft in a direction opposite to the predetermined direction to move the slide to a second position located at the same height as the first position beyond the top dead center; and
- rotating the main shaft from the second position in the predetermined direction by an amount corresponding to a half of the counted pulses to detect the top dead center.

* * * * *